US009866155B2

(12) United States Patent
Sugawara et al.

(10) Patent No.: US 9,866,155 B2
(45) Date of Patent: Jan. 9, 2018

(54) MOTOR CONTROL UNIT AND ELECTRIC POWER STEERING APPARATUS EQUIPPED WITH THE SAME

(71) Applicant: NSK Ltd., Tokyo (JP)

(72) Inventors: Takayoshi Sugawara, Tokyo (JP); Ryo Minaki, Tokyo (JP); Hideki Sawada, Tokyo (JP)

(73) Assignee: NSK LTD., Tokyo (JP)

( * ) Notice: Subject to any disclaimer, the term of this patent is extended or adjusted under 35 U.S.C. 154(b) by 0 days.

(21) Appl. No.: 15/536,396

(22) PCT Filed: Feb. 2, 2016

(86) PCT No.: PCT/JP2016/053006
§ 371 (c)(1),
(2) Date: Jun. 15, 2017

(87) PCT Pub. No.: WO2016/125774
PCT Pub. Date: Aug. 11, 2016

(65) Prior Publication Data
US 2017/0331398 A1 Nov. 16, 2017

(30) Foreign Application Priority Data
Feb. 3, 2015 (JP) .................. 2015-019008

(51) Int. Cl.
*H02P 1/04* (2006.01)
*B62D 5/04* (2006.01)
(Continued)

(52) U.S. Cl.
CPC ............... *H02P 6/085* (2013.01); *H02P 6/10* (2013.01); *H02P 6/185* (2013.01); *B62D 5/046* (2013.01); *H02P 6/04* (2013.01); *H02P 6/17* (2016.02)

(58) Field of Classification Search
None
See application file for complete search history.

(56) References Cited

U.S. PATENT DOCUMENTS

2011/0272205 A1* 11/2011 Fujimoto ............... B62D 5/046
180/446
2014/0212312 A1 7/2014 Kozaki et al.

FOREIGN PATENT DOCUMENTS

CN 102611348 A 7/2012
JP 2004-088888 A 3/2004
(Continued)

OTHER PUBLICATIONS

International Preliminary Report on Patentability of PCT/JP2016/053006 dated Dec. 27, 2016.
(Continued)

*Primary Examiner* — Bentsu Ro
*Assistant Examiner* — Zemenay Truneh
(74) *Attorney, Agent, or Firm* — Sughrue Mion, PLLC

(57) ABSTRACT

[Problem]
An object of the present invention is to provide a motor control unit that the heat generation of FETs is not concentrated in one FET and the heat generation is distributed to the plural FETs by operating the duties of all three-phases in a case that the driving of the motor is stopped.
[Means for Solving the Problem]
The present invention is the motor control unit comprising a current detector; an upper-stage maximum heat generation-phase specifying means to calculate respective heat generation amounts of upper-stage FETs and specify an upper-stage maximum heat generation phase; a lower-stage maximum heat generation-phase specifying means to calculate respective heat generation amounts of lower-stage FETs and specify a lower-stage maximum heat generation phase; an upper-stage selecting means to select an upper-
(Continued)

stage selecting duty and an upper-stage selecting phase current based on the upper-stage maximum heat generation phase; a lower-stage selecting means to select a lower-stage selecting duty and a lower-stage selecting phase current based on the lower-stage maximum heat generation phase; a duty operating amount calculating section to calculate a duty operating amount; and a duty operating section to operate the respective phase duties based on the duty operating amount.

20 Claims, 9 Drawing Sheets

(51) Int. Cl.
| | | |
|---|---|---|
| *H02P 6/08* | (2016.01) | |
| *H02P 6/10* | (2006.01) | |
| *H02P 6/185* | (2016.01) | |
| *H02P 6/04* | (2016.01) | |
| *H02P 6/17* | (2016.01) | |

(56) References Cited

FOREIGN PATENT DOCUMENTS

| | | |
|---|---|---|
| JP | 2004-161118 A | 6/2004 |
| JP | 2014-147170 A | 8/2014 |
| JP | 2014-155371 A | 8/2014 |

OTHER PUBLICATIONS

International Search Report of PCT/JP2016/053006 dated Apr. 12, 2016.

* cited by examiner

PRIOR ART

PRIOR ART ically to the modulation signal CF. The inverter 37 is configured to the three-phase bridges of the FETs (an upper-stage is FET1 to FET3, and a lower-stage is FET4 to

MOTOR CONTROL UNIT AND ELECTRIC POWER STEERING APPARATUS EQUIPPED WITH THE SAME

CROSS REFERENCE TO RELATED APPLICATIONS

This is a National Stage of International Application No. PCT/JP2016/053006 filed Feb. 2, 2016, claiming priority based on Japanese Patent Application No. 2015-019008 filed Feb. 3, 2015, the contents of all of which are incorporated herein by reference in their entirety.

TECHNICAL FIELD

The present invention relates to a motor control unit that calculates respective phase duties for a pulse width modulation (PWM)-control based on a current command value and controls the motor via an inverter configured with upper-stage and lower-stage field effect transistor (FET) bridges, and an electric power steering apparatus equipped with the above motor control unit, and in particular to the motor control unit that distributes a heat generation not to concentrate the heat generation in a particular FET, and to the electric power steering apparatus equipped with the above motor control unit.

BACKGROUND ART

An electric power steering apparatus (EPS) which provides a steering system of a vehicle with a steering assist torque (an assist torque) by means of a rotational torque of a motor, applies the steering assist torque to a steering shaft or a rack shaft by means of a transmission mechanism such as gears or a belt through a reduction mechanism. In order to accurately generate the assist torque, such a conventional electric power steering apparatus performs a feedback control of a motor current. The feedback control adjusts a voltage supplied to the motor so that a difference between a steering assist command value (a current command value) and a detected motor current value becomes small, and the adjustment of the voltage applied to the motor is generally performed by an adjustment of a duty of a pulse width modulation (PWM) control.

A general configuration of the conventional electric power steering apparatus will be described with reference to FIG. 1. As shown in FIG. 1, a column shaft (a steering shaft or a handle shaft) 2 connected to a steering wheel (handle) 1 is connected to steered wheels 8L and 8R through reduction gears 3, universal joints 4a and 4b, a rack-and-pinion mechanism 5, and tie rods 6a and 6b, further via hub units 7a and 7b. In addition, the column shaft 2 is provided with a torque sensor 10 for detecting a steering torque Th of the steering wheel 1, and a motor 20 for assisting a steering force of the steering wheel 1 is connected to the column shaft 2 through the reduction gears 3. The electric power is supplied to a control unit (ECU) 30 for controlling the electric power steering apparatus from a battery 13, and an ignition key signal is inputted into the control unit 30 through an ignition key 11. The control unit 30 calculates a current command value of an assist command on the basis of a steering torque Th detected by the torque sensor 10 and a vehicle speed Vel detected by a vehicle speed sensor 12, and controls a current supplied to the motor 20 by means of a voltage control value Vref obtained by performing compensation or the like to the calculated current command value. A steering angle sensor 14 is not indispensable and may not be provided. It is possible to obtain the steering angle from a rotational position sensor which is connected to the motor 20.

A controller area network (CAN) 40 to send/receive various information and signals on the vehicle is connected to the control unit 30, and it is also possible to receive the vehicle speed Vel from the CAN. Further, a Non-CAN 41 is also possible to connect to the control unit 30, and the Non-CAN 41 sends and receives a communication, analogue/digital signals, electric wave or the like except for the CAN 40.

In such an electric power steering apparatus, the control unit 30 mainly comprises a CPU (Central Processing Unit) (including an MPU (Micro Processing Unit) and an MCU (Micro Controller Unit))), and general functions performed by programs within the CPU are, for example, shown in FIG. 2.

Functions and operations of the control unit 30 will be described with reference to FIG. 2. The steering torque Th from the torque sensor 10 and the vehicle speed Vel from the vehicle speed sensor 12 are inputted into a torque control section 31. The torque control section 31 calculates a current command value Iref1 based on the steering torque Th and the vehicle speed Vel using an assist map or the like. The calculated current command value Iref1 is added with a compensation signal CM for improving characteristics from a compensating section 34 at an adding section 32A. The current command value Iref2 after addition is limited the maximum value thereof at a current limiting section 33. The current command value Irefm limited the maximum value is inputted into a subtracting section 32B, whereat a detected motor current value Im is subtracted from the current command value Irefm.

The subtraction result I (=Irefm−Im) at the subtracting section 32B is current-controlled at the current control section 35 such as a proportional-integral (PI) control and so on. The voltage control value Vref obtained by the current control is inputted into a PWM-control section 36, whereat a duty thereof is calculated. The motor 20 is PWM-driven by an inverter 37 with a PWM signal calculated the duty. The motor current value Im of the motor 20 is detected by a motor current detection means 38 and is inputted into the subtracting section 32B for the feedback.

The compensating section 34 adds a self-aligning torque (SAT) detected or estimated and an inertia compensation value 342 at an adding section 344. The addition result is further added with a convergence control value 341 at an adding section 345. The addition result is inputted into the adding section 32A as the compensation signal CM, thereby to improve the control characteristics.

In a case that the motor 20 is a three-phase brushless motor, details of the PWM-control section 36 and the inverter 37 have a configuration as shown in FIG. 3, and the PWM-control section 36 comprises a duty calculating section 36A that calculates the duties D1 to D6 which are used in a three-phase PWM-control by using the voltage control value Vref in accordance with a predetermined equation, and a gate driving section 36B that drives gates of the FETs serving as the driving device by means of the duties D1 to D6 and switches-ON or switches-OFF for compensating a dead time. The modulation signal (carrier) CF is inputted into the duty calculating section 36A, and the duty calculating section 36A calculates the duties D1 to D6 by synchronized to the modulation signal CF. The inverter 37 is configured to the three-phase bridges of the FETs (an upper-stage is FET1 to FET3, and a lower-stage is FET4 to FET6). The motor 20 is driven by switching-ON or switching-OFF the respective FETs by using the duties D1 to D6.

In this example, the duties D1 to D3 control the switching-ON or the switching-OFF of the upper-stage FET1 to FET3, and the duties D4 to D6 control the switching-ON or the switching-OFF of the lower-stage FET4 to FET6.

A motor release switch 23 is interposed between the inverter 37 and the motor 20 in order to block a current supply when the assist control is stopped or the like. The motor release switch 23 comprises the FETs with a parasitic diode disposed to respective phases.

In such an electric power steering apparatus, a conventional technology, which performs a control by means of only a commutation process with a simple two-phase/three-phase conversion in response to a torque command of the motor and an electrical angle of the motor, cannot control the heat generation of the respective FETs, individually. Thus, even though the heat generation amounts of the overall ECU, each site of the ECU, the motor or the like are individually measured and estimated, in final, by limiting the torque command value of the motor, a protection process which suppresses the heat generation in the overall system can only be performed. For example, when the maximum current in the system flows through the system in a state of a steering holding of the handle, the heat generation is concentrated in a particular FET. In a case that the above state continues in a long time, the FET, which the heat generation is concentrated, is earlier deviated from an operating temperature range than other parts, and then is failed.

In order to prevent the above failure, the conventional technique monitors the system by individually measuring or estimating a temperature of each site of the system and protects by suppressing the torque command value of the motor so that the temperatures of all locations do not deviate from the operating temperature range. However, since such a protecting process limits the torque command value of the motor, there is a problem that the limitation must be exactly controlled such that a decreasing of the assist force and a distinct lack of the assist do not occur or a driver does not notice the decreasing of the assist force.

As resolving such a problem, Japanese Unexamined Patent Publication No. 2004-161118 A (Patent Document 1) proposes a power steering apparatus that suppresses the occurrence of the specific noise in the PWM-control and prevents from increasing a temperature of the driving device up to a temperature in a failure of the motor. The driving control of the motor is accomplished by PWM-controlling the driving circuit by the electronic control unit. The electronic control unit changes a carrier frequency of the PWM signal which is applied to the driving circuit in response to the temperature of the power driving device detected by the driving device temperature sensor. That is, when the temperature of the power driving device is lower than a predetermined frequency switching temperature, the PWM frequency is set to a predetermined high frequency, and when the temperature of the power driving device is higher than or equal to the predetermined frequency switching temperature, the PWM frequency is set to a predetermined low frequency.

Further, a motor driving unit disclosed in Japanese Unexamined Patent Publication No. 2004-88888 A (Patent Document 2) introduces a driving current from two among a U-phase terminal, a V-phase terminal and a W-phase terminal in order to reduce the heat generation due to a switching loss. When the driving current should be derived from another terminal, a target voltage value of the terminal from which the driving current is derived, is set to a ground level of an electric potential. When the driving current is introduced from one terminal in the U-phase terminal to the W-phase terminal and the driving current should be derived from other two terminals, the target voltage value of terminal which the driving current is introduced, is set to the output voltage of the DC (direct current)-power supply.

THE LIST OF PRIOR ART DOCUMENTS

Patent Documents

Patent Document 1: Japanese Unexamined Patent Publication No. 2004-161118 A
Patent Document 2: Japanese Unexamined Patent Publication No. 2004-88888 A

SUMMARY OF THE INVENTION

Problems to be Solved by the Invention

However, in the power steering apparatus disclosed in Patent Document 1, when a monitoring temperature surrounding the FETs is higher than a threshold, in order to control the carrier frequency of PWM toward the low frequency, it is occurred the following problems that the sound pressure largely arises due to an occurrence of a switching noise in an audio frequency range, an amplitude of a current switching noise component which passes through the motor is enhanced, and a motor torque due to an occurrence of an eddy current or a magnetic saturation is reduced. The above technique disclosed in Patent Document 1, is used as means of continuing an assist of the steering.

The motor driving unit disclosed in Patent Document 2 reduces the switching loss by a concept of a simple sinusoidal approximating driving from a sinusoidal driving method of the DC-brushless motor. However, the heat generation due to the switching loss is smaller than that of a loss due to an ON-resistor of the switching devices, and further specific switching devices continue switching-ON under a specific situation. Thus, the heat generation is concentrated in the switching devices which are switched-ON. Even though the heat generation of all six switching devices can be reduced, as a result, the problems that the motor current corresponding to the torque command value of the motor must be reduced in order to protect the switching devices from a heat breakdown or the like, occur. Therefore, the obtained effect is extremely limited.

Furthermore, in the conventional motor control, in a situation that the motor current is not changed or is gradually changed in the steering holding or an extremely slow steering, there is a problem that the heat generation in the specific devices of the motor driving circuit (for example, FETs for switching and so on) is concentrated. This problem is a remarkable one in the brushless DC-motor driving circuit (any driving method including PWM is applied). In the driving circuit which always needs to a rotational magnetic field, in a case that a rotational speed of the magnetic field is small, a problem may occur.

The present invention has been developed in view of the above-described circumstances, and an object of the present invention is to provide the motor control unit that the heat generation of the FETs (switching devices) is not concentrated in one FET and the heat generation is distributed to the plural FETs by operating the duties of the all three-phases in a case that the driving of the motor is stopped (including almost stopped), and the electric power steering apparatus equipped with the motor.

Means for Solving the Problems

The present invention relates to a motor control unit that calculates respective phase duties for a PWM-control based on a current command value and controls a motor via an inverter configured with upper-stage and lower-stage FET bridges, the above-described object of the present invention is achieved by that comprising: a current detector to detect respective phase currents of the motor; an upper-stage maximum heat generation-phase specifying means to calculate respective heat generation amounts of upper-stage FETs and specify an upper-stage maximum heat generation-phase; a lower-stage maximum heat generation-phase specifying means to calculate respective heat generation amounts of lower-stage FETs and specify a lower-stage maximum heat generation-phase; an upper-stage selecting means to select an upper-stage selecting duty and an upper-stage selecting phase current based on the upper-stage maximum heat generation-phase; a lower-stage selecting means to select a lower-stage selecting duty and a lower-stage selecting phase current based on the lower-stage maximum heat generation-phase; a duty operating amount calculating section to calculate a duty operating amount based on the upper-stage selecting duty, the upper-stage selecting phase current, the lower-stage selecting duty and the lower-stage selecting phase current; and a duty operating section to operate the respective phase duties based on the duty operating amount.

Furthermore, the above-described object of the present invention is more effectively achieved by that: wherein the upper-stage maximum heat generation-phase specifying means comprises an upper-stage FET-heat generation amount calculating section to calculate respective heat generation amounts of upper-stage FETs, and an upper-stage maximum heat generation-phase specifying section to specify the upper-stage maximum heat generation-phase based on respective heat generation amounts calculated at the upper-stage FET-heat generation amount calculating section; or wherein the lower-stage maximum heat generation-phase specifying means comprises a lower-stage FET heat generation amount calculating section to calculate respective heat generation amounts of lower-stage FETs, and a lower-stage maximum heat generation-phase specifying section to specify the lower-stage maximum heat generation-phase based on respective heat generation amounts calculated at the lower-stage FET-heat generation amount calculating section; or wherein the heat generation amounts of the upper-stage FETs and the heat generation amounts of the lower-stage FETs are calculated by a calculation or by referring to a map; or wherein square values of the respective phase currents are LPF-processed and are limited by a predetermined lower limiting value, and the limited amounts are multiplied by the respective phase duties and are outputted as respective heat generation amounts of the upper-stage FETs and respective heat generation amounts of the lower-stage FETs; or wherein the predetermined lower limiting value is a tuning value, or wherein the upper-stage selecting means comprises a first duty selecting section to select the upper-stage selecting duty from the respective phase duties based on the upper-stage maximum heat generation-phase, and a first phase current selecting section to select the upper-stage selecting phase current from the respective phase currents based on the upper-stage maximum heat generation-phase; or wherein the lower-stage selecting means comprises a second duty selecting section to select the lower-stage selecting duty from the respective phase duties based on the lower-stage maximum heat generation-phase, and a second phase current selecting section to select the lower-stage selecting phase current from the respective phase currents based on the lower-stage maximum heat generation-phase; or wherein the duty operating amount calculating section calculates the duty operating amount by "{(the lower-stage selecting phase current×the lower-stage selecting phase current×the lower-stage selecting duty)−(the upper-stage selecting phase current×the upper-stage selecting phase current×the upper-stage selecting duty)}/{(the upper-stage selecting phase current×the upper-stage selecting phase current)+(the lower-stage selecting phase current×the lower-stage selecting phase current)}×100(%)"; or wherein the duty operating section adds to the upper-stage respective phase duties and subtracts from the lower-stage respective phase duties.

The present invention is available for all of switching devices that drive the motor by switching-ON or switching-OFF due to respective phase duties. In this explanation, these are referred to as "FET".

Effects of the Invention

According to the motor control unit of the present invention, all phase duties by which the motor is driven is operated so as not to concentrate the heat generation of the FETs in one FET and to distribute the heat generation to plural FETs. The duty operating amounts are calculated by calculating the heat generation amounts of the respective FETs, and the respective phase duties are operated based on the duty operating amount. As a result, the heat generation is not concentrated in one FET, an equilibrium of the heat distribution is achieved, site of the heat generation is distributed, and a reduction in the assist force due to the overheat protection and so on is not almost occurred.

By using an electric power steering apparatus equipped with the motor control unit, it is possible to provide the electric power steering apparatus having a high reliable ECU.

MODE FOR CARRYING OUT THE INVENTION

Figure 1:
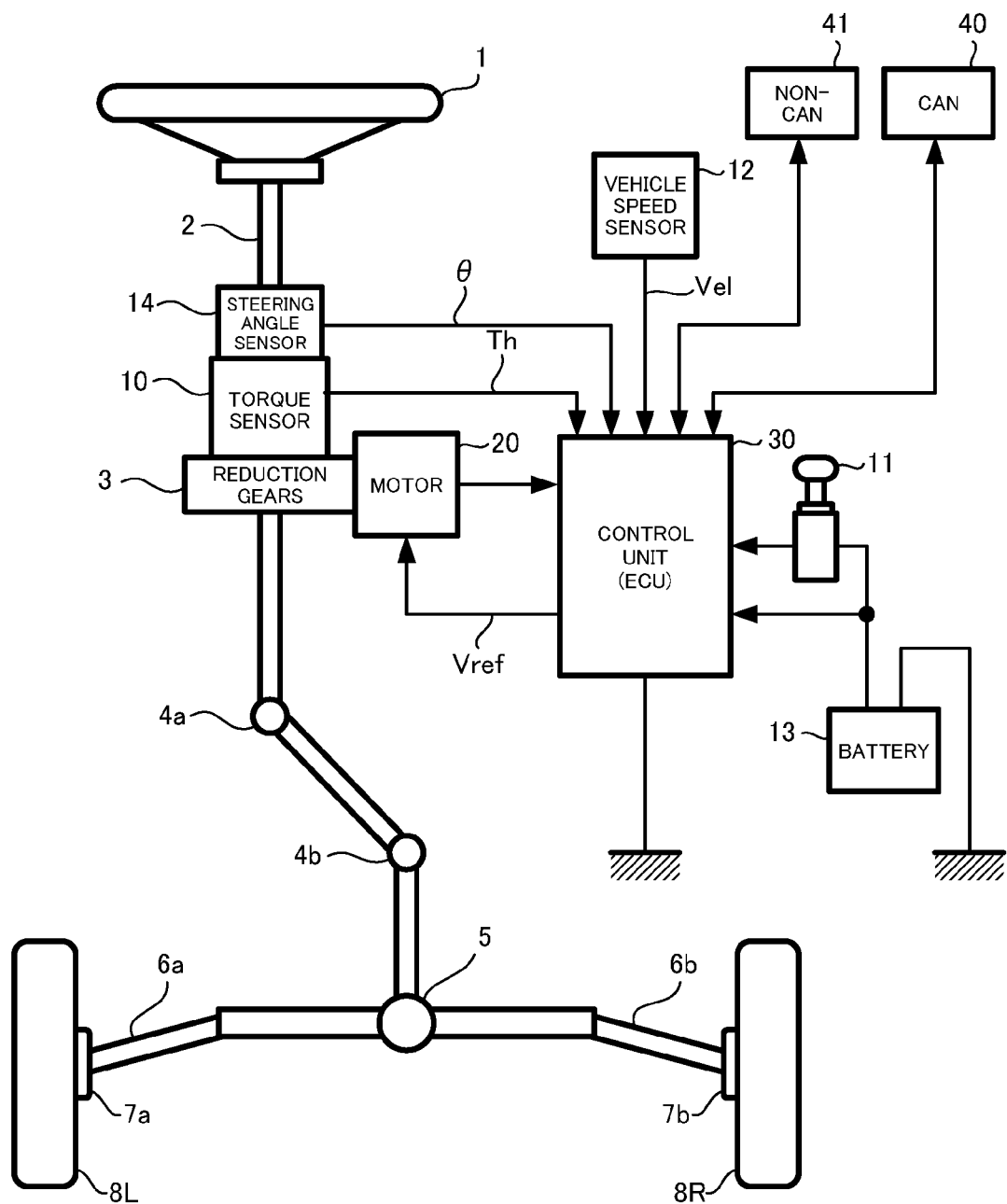
FIG. 1 is a configuration diagram illustrating a general outline of an electric power steering apparatus.

In an electric power steering apparatus equipped with a motor control unit, in a steering holding or the like (a rack end hitting, a curb stone hitting, or an extremely slow steering by a driver (it is almost a steering holding but holding))), a situation that the motor generates the maximum torque or an almost maximum torque, and the motor is stopped or almost stopped, by continuing passing the maximum current or an almost maximum current for a long time through specific FETs in driving a three-phase brushless motor, there is a problem that a heat generation is concentrated in the only specific FET. Accordingly, the present invention realizes that the FET-heat generation is distributed to plural FET without the concentration to the specific FET by operating the duties for the three-phases with the duty operating amount in order to improve the above problem.

By calculating the heat generation of the respective FETs based on current values passing through the respective FETs and the duties, and further by operating the duties so as not to concentrate the heat generation in one FET, the heat distribution is balanced, sites of the heat generation are distributed, and a reduction in an assist force due to an overheat protection or the like is not almost occurred. Concretely, by specifying an FET of the most heat generation based on the respective heat amounts of the FETs, by calculating the duties for the specified FET in order to reduce the heat generation and further by operating in a consideration of the duties with maintaining voltages between terminals, it is possible to more suppress the concentration of the heat generation without a feeling incompatibility and a contradictory in comparison with a conventional protection technology.

The heat generation of the individual FET is obtained by a multiplication of an ON-resistance of the FET, square of the flowing current and the duty (ON-time). Assuming that the ON-resistances of the FETs are constant, in this case, the ON-resistances are not considered. For example, in three-phases U-phase to W-phase, the following conditions are considered.

(1) The motor current of the U-phase is 80 [A], the ON-time of the U-phase upper-stage FET is 66%, and the ON-time of the U-phase lower-stage FET is 34%.
(2) The motor current of the V-phase is −40 [A], the ON-time of the V-phase upper-stage FET is 42%, and the ON-time of the V-phase lower-stage FET is 58%.
(3) The motor current of the W-phase is −40 [A], the ON-time of the W-phase upper-stage FET is 42%, and the ON-time of the W-phase lower-stage FET is 58%.

In a case of the above conditions, heat generation rates of the respective FETs are as follows.

(a) U-phase upper-stage FET: 80×80×0.66=4224 [W]
(b) U-phase lower-stage FET: 80×80×0.34=2176 [W]
(c) V-phase upper-stage FET: 40×40×0.42=672 [W]
(d) V-phase lower-stage FET: 40×40×0.58=928 [W]
(e) W-phase upper-stage FET: 40×40×0.42=672 [W]
(f) W-phase lower-stage FET: 40×40×0.58=928 [W]

Here, they are normalized by the maximum value 4224 [W], the normalized heat generation rates are as follows. That is, the U-phase upper-stage FET is 100%, the U-phase lower-stage FET is 52%, the V-phase upper-stage FET is 16%, the V-phase lower-stage FET is 22%, the W-phase upper-stage FET is 16%, and the W-phase lower-stage FET is 22%. The U-phase upper-stage FET is the most heat generation in comparison to other FETs, and the V-phase upper-stage FET and the W-phase upper-stage FET are the least heat generation. In order to reduce a heat generation imbalance among the FETs, the duty operating that the duties of the all three-phase upper-stage FETs evenly decrease 16% and those of the all three-phase lower-stage FETs evenly increase 16%, is performed. Since the voltage between the terminals in view from the motor is kept a constant voltage difference, the current values which pass through the respective phases are maintained, and therefore the heat generation rates of the FETs are changeable as follows.

(a-1) U-phase upper-stage FET: 80×80×0.50=3200 [W]
(b-1) U-phase lower-stage FET: 80×80×0.50=3200 [W]
(c-1) V-phase upper-stage FET: 40×40×0.26=416 [W]
(d-1) V-phase lower-stage FET: 40×40×0.74=1184 [W]
(e-1) W-phase upper-stage FET: 40×40×0.26=416 [W]
(f-1) W-phase lower-stage FET: 40×40×0.74=1184 [W]

Then, according to the present invention, the heat generation amounts of the respective FETs based on the respective phase duties and the respective phase currents are calculated, and the duty operating amount is calculated in order to equally distribute the heat generation which is concentrated in the specific FET to plural (two or more) FETs. By using the calculated duty operating amount, the duties of all FETs are operated in maintaining the voltages between the terminals of the three phases, and the heat generations of the FETs are distributed in not changing the assist force.

Embodiments according to the present invention will be described with reference to the drawings.

Figure 2:
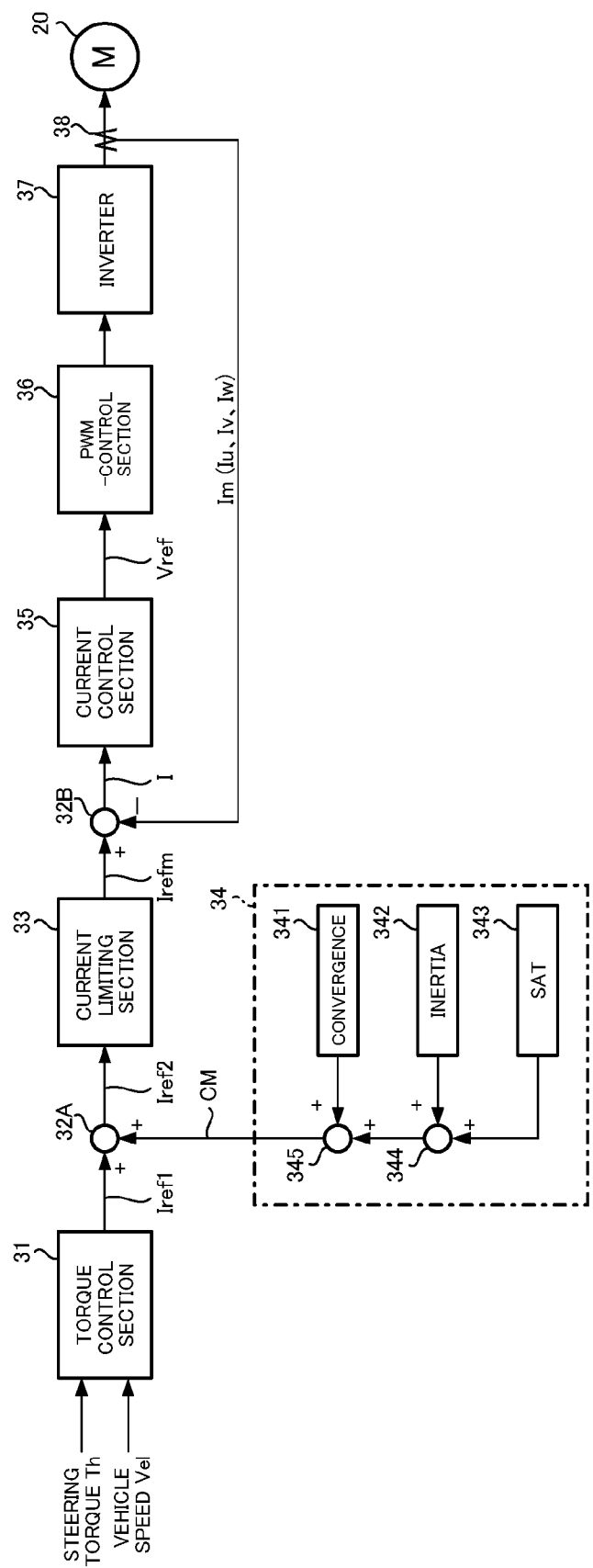
FIG. 2 is a block diagram showing a general configuration example of a control system of the electric power steering apparatus.
Figure 3:
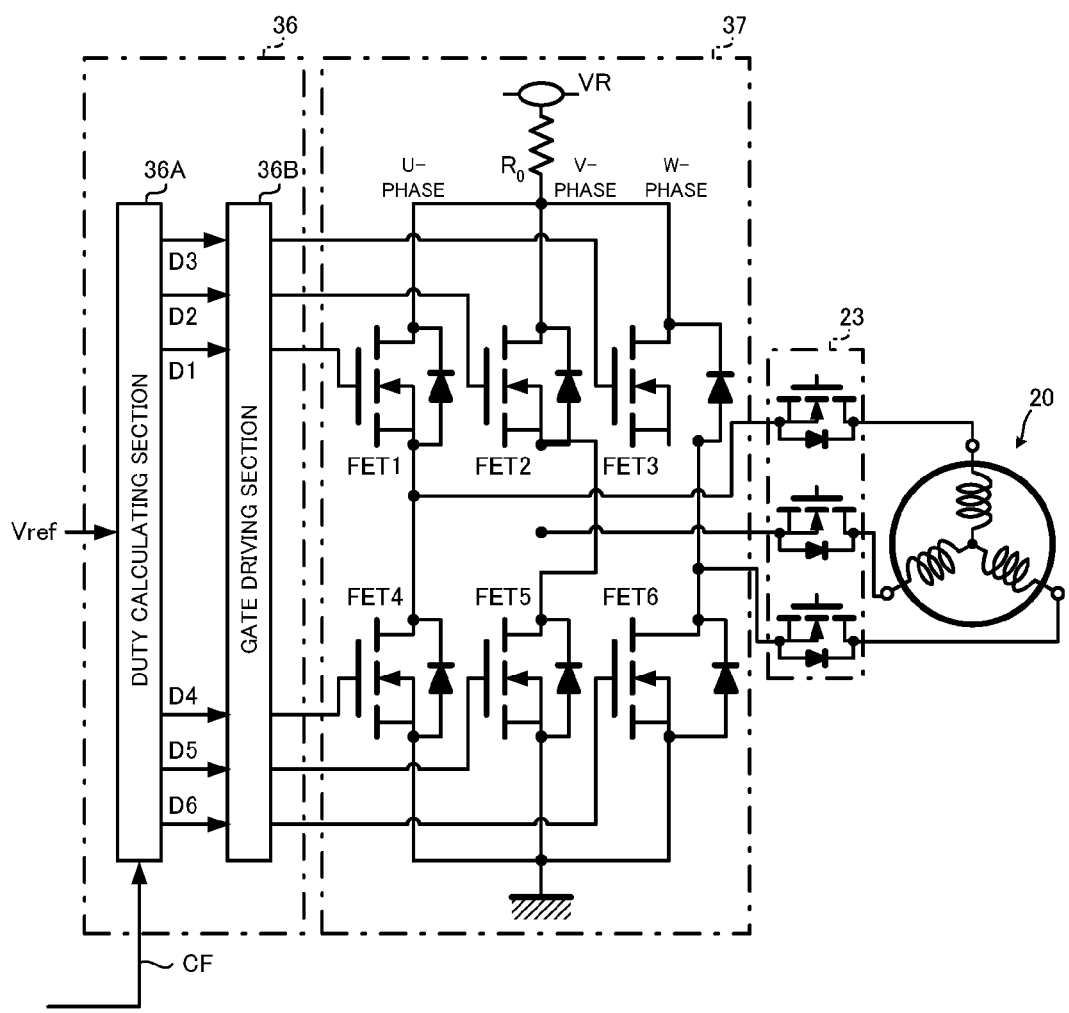
FIG. 3 is a wiring diagram illustrating a configuration example of a PWM-control section and an inverter.
Figure 4:
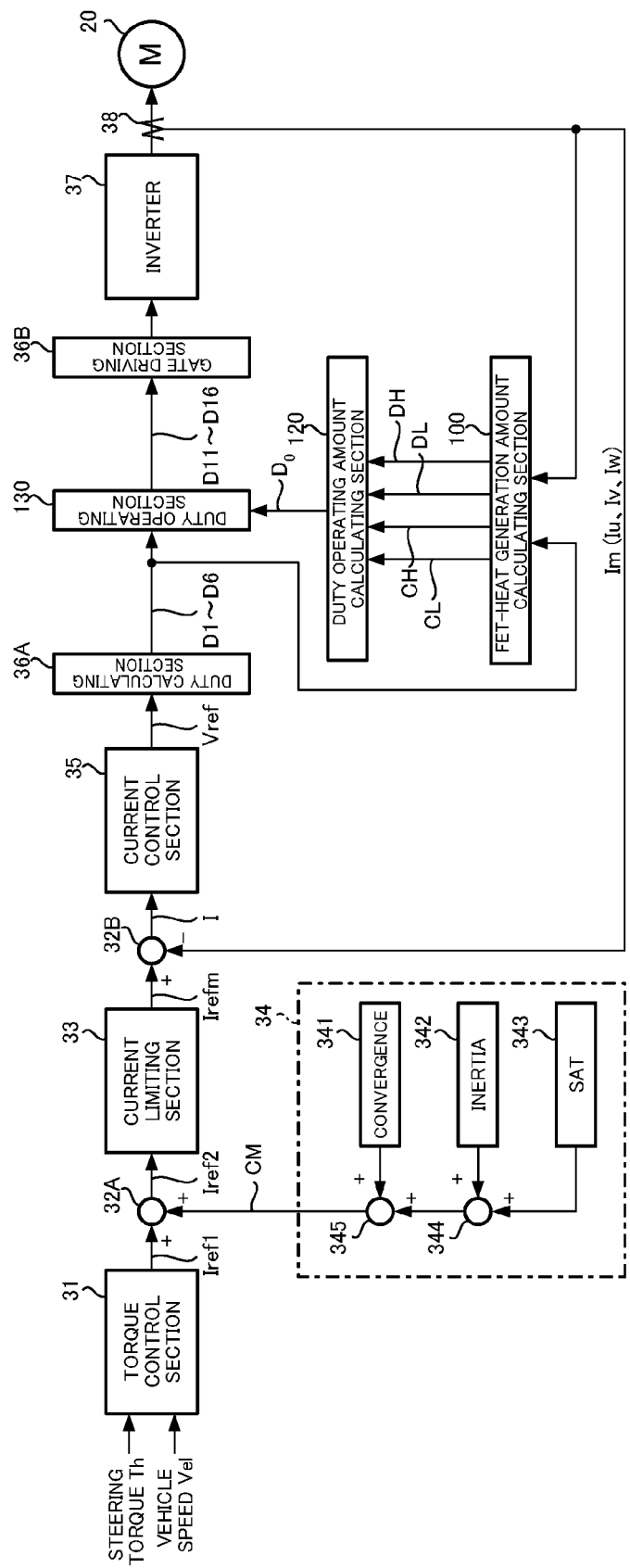
FIG. 4 is a wiring diagram illustrating a configuration example of the present invention.

FIG. 4 shows a configuration example of the present invention corresponding to FIG. 2, the respective phase duties D1 to D6 that are calculated at a duty calculating section 36A, are inputted into a duty operating section 130 and an FET-heat generation amount calculating section 100. Respective currents Im (Iu, Iv, Iw) of the motor 20 detected by the motor current detector 38 are fed-back to the subtracting section 32B, and are inputted into the FET-heat generation amount calculating section 100. An upper-stage selecting duty DH, a lower-stage selecting duty DL, an upper-stage selecting phase current CH and a lower-stage selecting phase current CL, which are calculated at the FET-heat generation amount calculating section 100, are inputted into the duty operating amount calculating section 120. A duty operating amount $D_O$, which is calculated at the duty operating amount calculating section 120, is inputted into the duty operating section 130. By using duties D11 to D16 after operating which are outputted from the duty operating section 130, the motor 20 is driven via the gate driving circuit 36B and the inverter 37.

Figure 5:
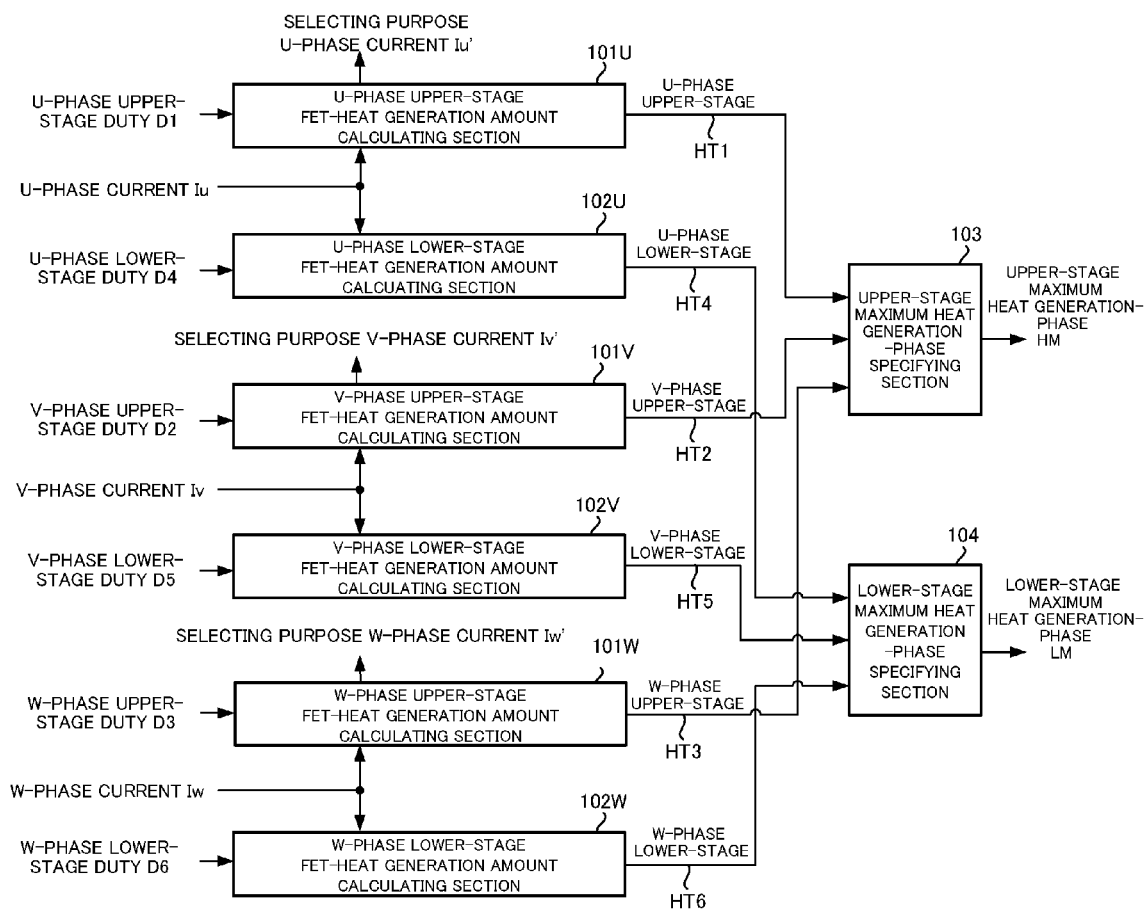
FIG. 5 is a block diagram illustrating a partial configuration example (maximum heat generation-phase) of an FET-heat generation amount calculating section.
Figure 6:
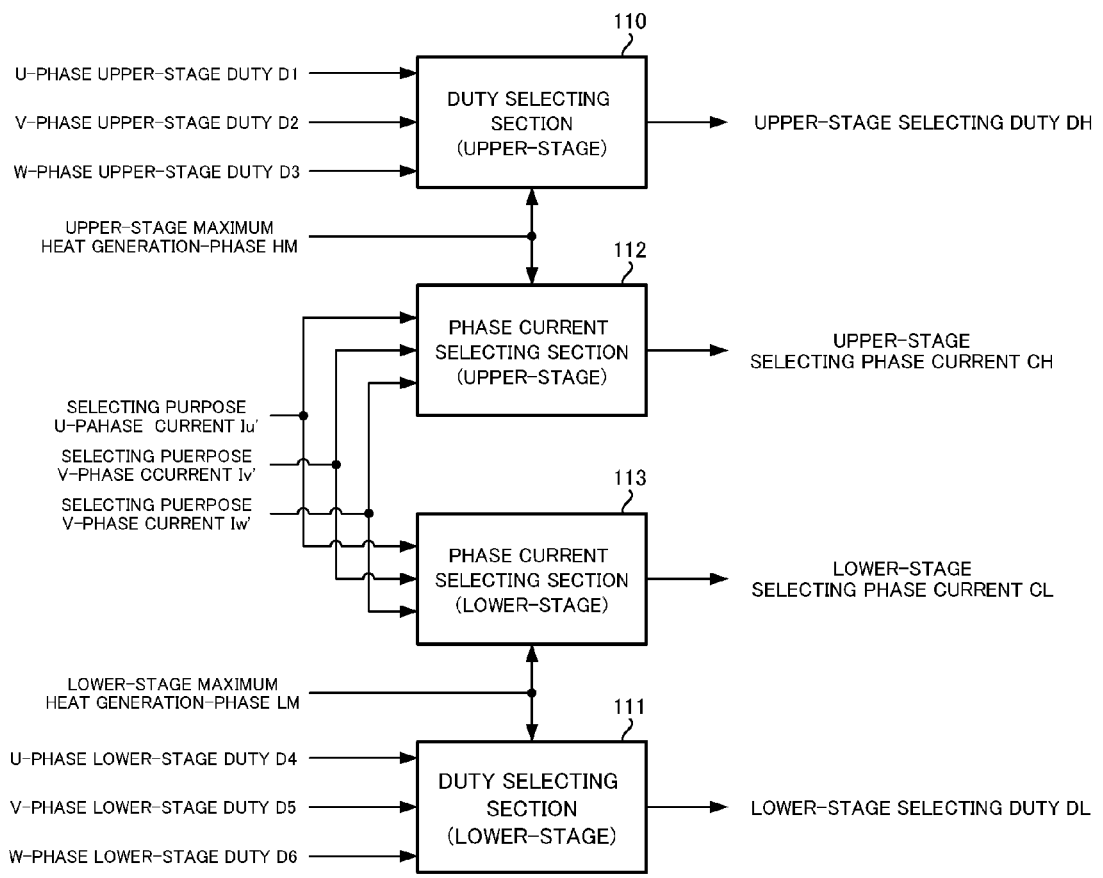
FIG. 6 is a block diagram illustrating a partial configuration example (selecting section) of the FET-heat generation amount calculating section.

FIG. 5 and FIG. 6 show a configuration example of the FET-heat generation amount calculating section 100, and a U-phase upper-stage duty D1 is inputted into a U-phase upper-stage FET-heat generation amount calculating section 101U and a duty selecting section (upper-stage) 110. A V-phase upper-stage duty D2 is inputted into a V-phase upper-stage FET-heat generation amount calculating section 101V and the duty selecting section (upper-stage) 110. A W-phase upper-stage duty D3 is inputted into a W-phase upper-stage FET-heat generation amount calculating section 101W and the duty selecting section (upper-stage) 110. A U-phase lower-stage duty D4 is inputted into a U-phase lower-stage FET-heat generation amount calculating section 102U and a duty selecting section (lower-stage) 111. A V-phase lower-stage duty D5 is inputted into a V-phase lower-stage FET-heat generation amount calculating section 102V and the duty selecting section (lower-stage) 111. A W-phase lower-stage duty D6 is inputted into a W-phase lower-stage FET-heat generation amount calculating section 102W and the duty selecting section (lower-stage) 111.

Further, the U-phase current Iu detected by the motor current detector 38 is inputted into the U-phase upper-stage FET-heat generation amount calculating section 101U and the U-phase lower-stage FET-heat generation amount calculating section 102U, and a selecting purpose U-phase current Iu', which is obtained by performing a below-described process, is inputted into a phase current selecting section (upper-stage) 112 and a phase current selecting section (lower-stage) 113. The V-phase current Iv is inputted into the V-phase upper-stage FET-heat generation amount calculating section 101V and the V-phase lower-stage FET-heat generation amount calculating section 102V, and a selecting purpose V-phase current Iv', which is obtained by performing the below-described process, is inputted into the phase current selecting section (upper-stage) 112 and the phase current selecting section (lower-stage) 113. The W-phase current Iw is inputted into the W-phase upper-stage FET-heat generation amount calculating section 101W and the W-phase lower-stage FET-heat generation amount calculating section 102W, and a selecting purpose W-phase current Iw', which is obtained by performing the below-described process, is inputted into the phase current selecting section (upper-stage) 112 and the phase current selecting section (lower-stage) 113.

A U-phase upper-stage FET-heat generation amount HT1 which is calculated at the U-phase upper-stage FET-heat generation amount calculating section 101U, a V-phase upper-stage FET-heat generation amount HT2 which is calculated at the V-phase upper-stage FET-heat generation amount calculating section 101V, and a W-phase upper-stage FET-heat generation amount HT3 which is calculated at the W-phase upper-stage FET-heat generation amount calculating section 101W are inputted into an upper-stage maximum heat generation-phase specifying section 103. The calculated selecting purpose U-phase current Iu' is outputted from the U-phase upper-stage FET-heat generation amount calculating section 101U, the calculated selecting purpose V-phase current Iv' is outputted from the V-phase upper-stage FET-heat generation amount calculating section 101V, and the calculated selecting purpose W-phase current Iw' is outputted from the W-phase upper-stage FET-heat generation amount calculating section 101W.

Further, a U-phase lower-stage FET-heat generation amount HT4 which is calculated at the U-phase lower-stage FET-heat generation amount calculating section 102U, a V-phase lower-stage FET-heat generation amount HT5 which is calculated at the V-phase lower-stage FET heat generation amount calculating section 102V, and a W-phase lower-stage FET-heat generation amount HT6 which is calculated at the W-phase lower-stage FET-heat generation amount calculating section 102W are inputted into an lower-stage maximum heat generation-phase specifying section 104.

An upper-stage maximum heat generation-phase specifying means comprises the U-phase upper-stage FET-heat generation amount calculating section 101U, the V-phase upper-stage FET-heat generation amount calculating section 101V, the W-phase upper-stage FET-heat generation amount calculating section 101W and the upper-stage maximum heat generation-phase specifying section 103, and a lower-stage maximum heat generation-phase specifying means comprises the U-phase lower-stage FET-heat generation amount calculating section 102U, the V-phase lower-stage FET-heat generation amount calculating section 102V, the W-phase lower-stage FET-heat generation amount calculating section 102W and the lower-stage maximum heat generation-phase specifying section 104. In addition, an upper-stage selecting means comprises the duty selecting section (upper-stage) 110 and the phase current selecting section (upper-stage) 112, and a lower-stage selecting means comprises the duty selecting section (lower-stage) 111 and the phase current selecting section (lower-stage) 113.

As well, the calculation of the heat generation amounts of the respective FETs is performed by the below Equation 1. The heat generation amounts may be calculated by a calculation or by referring to a map. Considering the ON-resistances of the FETs, the heat generation amounts can be more exactly calculated.

$$\text{FET-heat generation amount} = \text{phase current} \times \text{phase current} \times \text{Duty} \qquad \text{[Equation 1]}$$

In the FET heat generation calculating sections (101U to 101W, and 102U to 102W), the heat generation amount is calculated by multiplying a square of the phase current by the each phase duty, as expressed by the Equation 1. However, since a time constant exists in the heat generation due to influences of a heat capacity which the FET device has and the like, an actual FET temperature is not always coincident with the calculated result. Especially, in a situation that the phase currents of the motor remarkably vary, the above temperature inconsistency is likely to occur. Therefore, in the present invention, as shown in FIG. 7, a low pass filter (LPF) and a lower limiting value limiter is applied just after the calculation of the square of the phase current.

Figure 7:
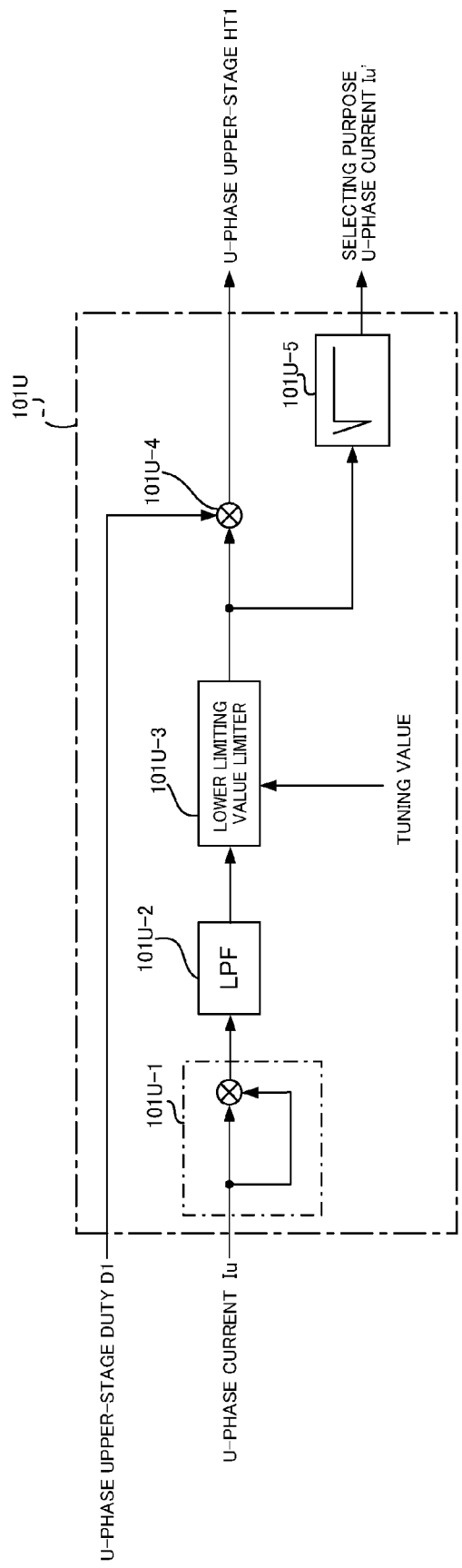
FIG. 7 is a block diagram illustrating a partial configuration example (U-phase upper-stage FET-heat generation amount calculating section) of the FET-heat generation amount calculating section.

Because the FET-heat generation calculating sections (101U to 101W, and 102U to 102W) have an almost same configuration, the U-phase upper-stage FET-heat generation amount calculating section 101U is described as an exemplified case as shown in FIG. 7. The U-phase current Iu is square-calculated at a square-calculating section 101U-1. A square-calculated value of the U-phase current is inputted into a LPF 101U-2, and an output from the LPF 101U-2 is limited to a lower limiting value by a tuning value at a lower limiting value limiter 101U-3. The amount which is limited to the lower limiting value at the lower limiting value limiter 101U-3 is inputted into a square-root section 101U-5, and is multiplied by the U-phase upper-stage duty D1 at a multiplying section 101U-4. Then, a multiplied result is outputted as the U-phase upper-stage heat generation amount HT1. A square root calculated at the square-root section 101U-5 is outputted as the selecting purpose U-phase current Iu'.

By providing the LPF 101U-2, a sensitivity that the U-phase current Iu remarkably varies is reduced, and the calculated result of the heat generation amount can be prevented from largely departing from the actual FET heat generation. Further, the lower limiting value limiter 101U-3 is provided at a rear stage of the LPF 101U-2. This is considered that the phase currents of the motor always continue to flow in a slight amount due to an influence of the switching operation in the PWM driving. Since a mean value of this slight amount current is zero, normally this current cannot be obtained as a current detecting value. However, in actual, the instantaneous slight current flows through the respective FETs and the respective phases of the motor, and this current causes the heat generation. Consequently, it is possible to obtain more accurate generation amount by setting a value of the heat generation amount corresponding to the slight current as the lower limiting value of the limiter process (101U-3) which is in advance considered as the tuning value.

The same limitation is performed at other heat generation amount calculating sections. The selecting purpose V-phase current Iv' is outputted from the V-phase upper-stage FET-heat generation amount calculating section 101V, and the selecting purpose W-phase current Iw' is outputted from the W-phase upper-stage FET-heat generation amount calculating section 101W. In this example, although the selecting purpose respective currents Iu' to Iw' are calculated at the upper-stage FET-heat generation amount calculating sections 101U to 101W, alternatively, the selecting purpose respective currents Iu' to Iw' may be calculated at the lower-stage FET-heat generation amount calculating sections 102U to 102W. Either the upper-stage FET-heat generation amount calculating section or the lower-stage FET-heat generation amount calculating section calculates the selecting purpose respective currents Iu' to Iw', and includes the square-root section. Other configurations are the same as the upper-stage FET-heat generation amount calculating section and the lower-stage FET-heat generation amount calculating section.

Further, specifying of the maximum heat generation phase is performed by respectively selecting the maximum heat generation amount phases for the upper-stage and the lower-stage.

The upper-stage maximum heat generation phase HM which is specified at the upper-stage maximum heat generation phase specifying section 103 is inputted into the duty selecting section (upper-stage) 110 and the phase current selecting section (upper-stage) 112, and the lower-stage maximum heat generation phase LM which is specified at the lower-stage maximum heat generation phase specifying section 104 is inputted into the duty selecting section (lower-stage) 111 and the phase current selecting section (lower-stage) 113.

As well, the selecting of the duty is performed by the duty of the maximum heat generation amount of the FET phase, and the selecting of the phase current is performed by the phase current of the maximum heat generation amount of the FET phase.

The upper-stage selecting duty DH from the duty selecting section (upper-stage) 110 and the lower-stage selecting duty DL from the duty selecting section (lower-stage) 111 are inputted into a duty operating amount calculating section 120, and the upper-stage selecting phase current CH from the phase current selecting section (upper-stage) 112 and the lower-stage selecting phase current CL from the phase current selecting section (lower-stage) 113 are inputted into the duty operating amount calculating section 120. The duty operating amount calculating section 120 calculates a duty operating amount $D_0$ (%) in accordance with a following Equation 2.

$$D_0(\%) = \{(CL \times CL \times DL) - (CH \times CH \times DH)\} / \{(CH \times CH) + (CL \times CL)\} \times 100 \quad \text{[Equation 2]}$$

Figure 8:
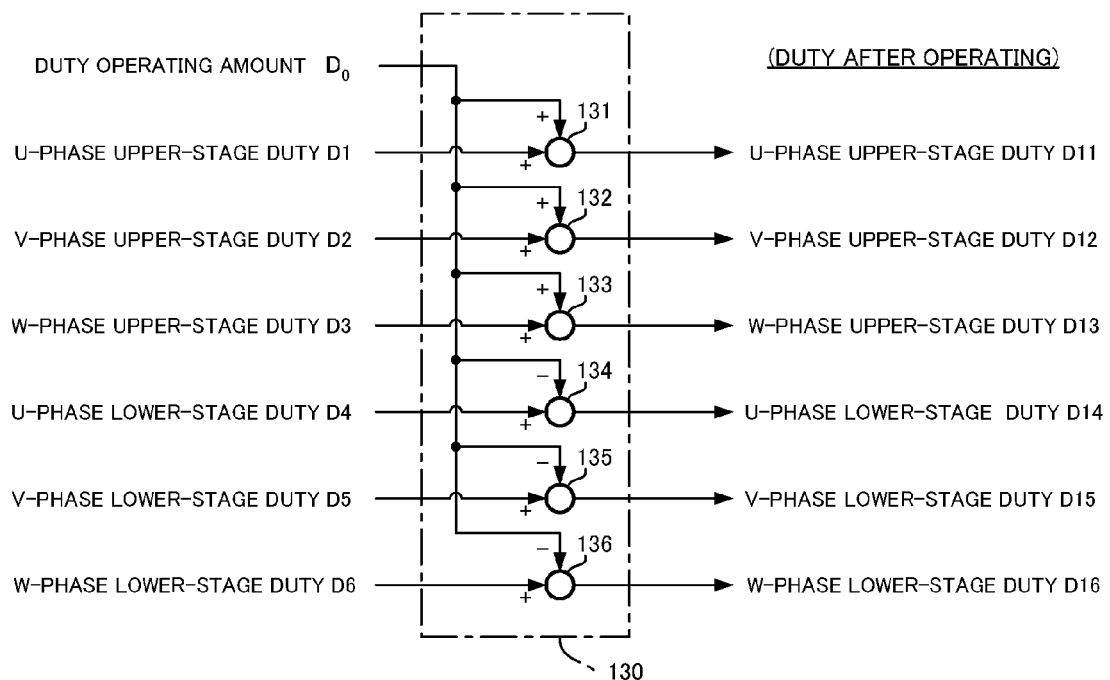
FIG. 8 is a block diagram illustrating a configuration example of a duty operating section.

The duty operating amount $D_0$ calculated in accordance with the Equation 2 at the duty operating amount calculating section 120 is inputted into the duty operating section 130 as shown in FIG. 8, is added for the upper-stage FETs, and is subtracted for the lower-stage FETs. Namely, the U-phase upper-stage duty D1 to the W-phase upper-stage duty D3 are inputted into the respective adding sections 131 to 133, and the U-phase lower-stage duty D1 to the W-phase lower-stage duty D3 are inputted into the respective subtracting sections 134 to 136. The duty operating amount $D_0$ is adding-inputted into the adding sections 131 to 133, and is subtracting-inputted into the subtracting sections 134 to 136. The duties D11 to D16 after operating are outputted.

Figure 9:
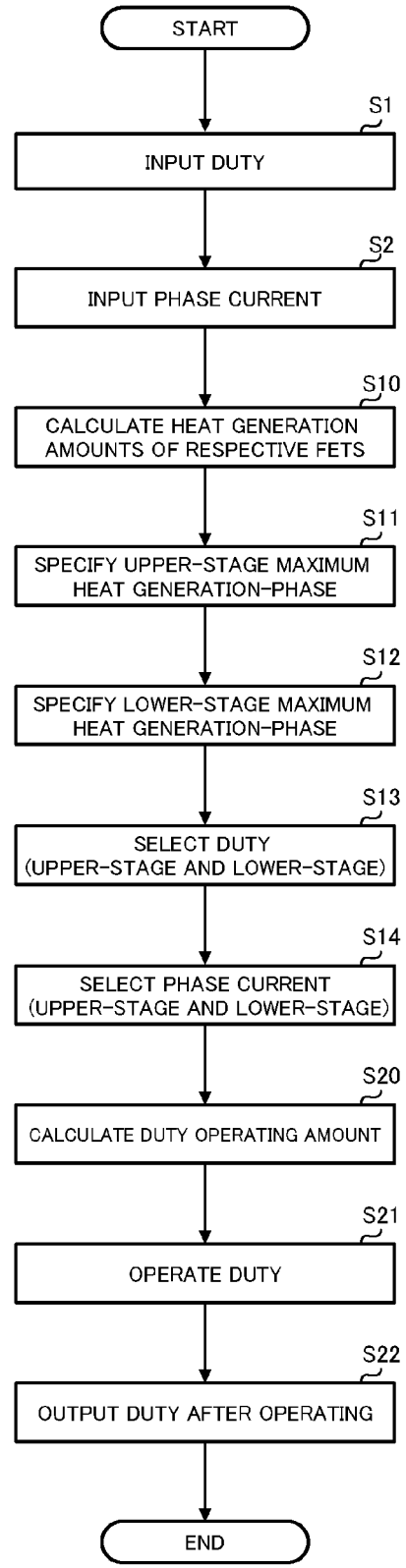
FIG. 9 is a flowchart illustrating an operating example of the present invention.

In the above configuration, the operating example will be described with reference to FIG. 9.

At first, the respective phase upper-stage duties D1 to D3 which are calculated at the duty calculating section 36A are inputted into the U-phase upper-stage FET-heat generation amount calculating section 101U to the W-phase upper-stage FET-heat generation amount calculating section 101W as well as the duty selecting section (upper stage) 110 (Step S1). Similarly, the respective phase lower-stage duties D4 to D6 are inputted into the U-phase lower-stage FET-heat generation amount calculating section 102U to the W-phase upper-stage FET-heat generation amount calculating section 102W as well as the duty selecting section (lower stage) 111 (Step S1). Further, the respective phase currents Iu to Iw which are detected by the current detector 38 are inputted into the U-phase FET-heat generation amount calculating sections 101U and 102U to the W-phase FET-heat generation amount calculating sections 101W and 102W (Step S2).

In the U-phase upper-stage FET-heat generation amount calculating section 101U to the W-phase upper-stage FET-heat generation amount calculating section 101W and the U-phase lower-stage FET-heat generation amount calculating section 102U to the W-phase lower-stage FET-heat generation amount calculating section 102W, in accordance with the Equation 1 or the configuration of FIG. 7, the heat generation amounts of the respective FETs and the selecting purpose respective currents are calculated by a calculation or a reference of a map (Step S10). The respective phase upper-stage FET-heat generation amounts HT1 to HT3 are inputted into the upper-stage maximum heat generation-phase specifying section 103, and then the maximum heat generation-phase HM is specified (Step S11). The respective phase lower-stage FET-heat generation amounts HT4 to HT6 are inputted into the lower-stage maximum heat generation-phase specifying section 104, and then the maximum heat generation-phase LM is specified (Step S12).

Next, in the duty selecting section (upper-stage) 110, the upper-stage selecting duty DH is selected in accordance with the upper-stage maximum heat generation-phase HM, and in the duty selecting section (lower-stage) 111, the lower-stage selecting duty DL is selected in accordance with the lower-stage maximum heat generation-phase LM (Step S13). Furthermore, in the phase current selecting section (upper-stage) 112, the upper-stage selecting phase current CH is selected in accordance with the upper-stage maximum heat generation-phase HM, and in the phase current selecting section (lower-stage) 113, the lower-stage selecting phase current CL is selected in accordance with the lower-stage maximum heat generation-phase LM (Step S14).

The upper-stage selecting duty DH, the lower-stage selecting duty DL, the upper-stage selecting phase current CH, and the lower-stage selecting phase current CL are inputted into the duty operating amount calculating section 120, and the duty operating amount calculating section 120 calculates the duty operating amount $D_0$ in accordance with the Equation 2 (Step S20). The calculated duty operating amount $D_0$ is inputted into the duty operating section 130, and the duty operating is performed at the adding section 131 to 133 and the subtracting section 134 to 136 (Step S21). The duty operating is represented by the below Equation 3.

$$D11 = D1 + D_0$$

$$D12 = D2 + D_0$$

$$D13 = D3 + D_0$$

$$D14 = D4 - D_0$$

$$D15 = D5 - D_0$$

$$D16 = D6 - D_0 \quad \text{[Equation 3]}$$

Duties D11 to D16 after operating, which are operated in accordance with the above Equation 3, are outputted (Step S22), thereby the motor 20 is driving-controlled.

By the above operating, in a case that the respective duties are more than 100% or less than 0%, the duty operating amount $D_0$ is decreased to a zero direction such that the respective duties are settled in a range of 100% to 0%. For example, in a case that the duty operating amount $D_0$ is 10% and the maximum upper-stage duty is 95%, the duty operating amount $D_0$ is decreased to 5% and the maximum upper-stage duty after operating is limited to 100%. In a case that the duty operating amount $D_0$ is −10% and the maximum lower-stage duty is 95%, the duty operating amount $D_0$ is varied to −5% and the maximum lower-stage duty after operating is limited to 100%.

In the above example, the selecting purpose respective phase currents Iu' to Iw' which are calculated at the upper-stage FET-heat generation amount calculating section or the lower-stage FET-heat generation amount calculating section are inputted into the upper-stage and lower-stage phase current selecting sections, and then the selecting is performed. In principle, the respective phase currents Iu to Iw which are detected by the motor current detector, may be used. The control (operating) of the present invention may continuously be operated. Timings of beginning and end are not needed. However, if a commutation interval of the motor current is shorter than the heat generation time constant of the FET, the duty operating does not have an effect. Alternatively, the switching devices which configure the inverter may be the semiconductor devices other than the FETs.

EXPLANATION OF REFERENCE NUMERALS 1 handle (steering wheel)
2 column shaft (steering shaft, handle shaft)
10 torque sensor
12 vehicle speed sensor
13 battery
20 motor
30 control unit (ECU)
31 torque control section
35 current control section
36 PWM-control section
36A duty calculating section
36B gate calculating section
37 inverter
38 motor current detection means
100 FET-heat generation amount calculating section
103 upper-stage maximum heat generation-phase specifying section
104 lower-stage maximum heat generation-phase specifying section
110 duty selecting section (upper-stage)
111 duty selecting section (lower-stage)
112 phase current selecting section (upper-stage)
113 phase current selecting section (lower-stage)
120 duty operating amount calculating section
130 duty operating section

The invention claimed is:

1. A motor control unit that calculates respective phase duties for a pulse width modulation (PWM)-control based on a current command value and controls a motor via an inverter configured with upper-stage and lower-stage field-effect transistor (FET) bridges, comprising:
   a current detector to detect respective phase currents of said motor;
   an upper-stage maximum heat generation-phase specifying means to calculate respective heat generation amounts of upper-stage FETs and specify an upper-stage maximum heat generation-phase;
   a lower-stage maximum heat generation-phase specifying means to calculate respective heat generation amounts of lower-stage FETs and specify a lower-stage maximum heat generation-phase;
   an upper-stage selecting means to select an upper-stage selecting duty and an upper-stage selecting phase current based on said upper-stage maximum heat generation-phase;
   a lower-stage selecting means to select a lower-stage selecting duty and a lower-stage selecting phase current based on said lower-stage maximum heat generation-phase;
   a duty operating amount calculating section to calculate a duty operating amount in order to distribute a heat generation which is concentrated in a specific FET to plural FETs based on said upper-stage selecting duty and said upper-stage selecting phase current, and said lower-stage selecting duty and said lower-stage selecting phase current; and
   a duty operating section to operate said respective phase duties so as to operate duties of all FETs with maintaining voltages between terminals of said respective phases based on said duty operating amount.

2. The motor control unit according to claim 1, wherein said upper-stage maximum heat generation phase specifying means comprises:
   an upper-stage FET-heat generation amount calculating section to calculate respective heat generation amounts of upper-stage FETs; and
   an upper-stage maximum heat generation-phase specifying section to specify said upper-stage maximum heat generation-phase based on respective heat generation amounts calculated at said upper-stage FET-heat generation amount calculating section.

3. The motor control unit according to claim 2, wherein said lower-stage maximum heat generation phase specifying means comprises:
   a lower-stage FET-heat generation amount calculating section to calculate respective heat generation amounts of lower-stage FETs; and
   a lower-stage maximum heat generation-phase specifying section to specify said lower-stage maximum heat generation-phase based on respective heat generation amounts calculated at said lower-stage FET-heat generation amount calculating section.

4. The motor control unit according to claim 2, wherein said heat generation amounts of said upper-stage FETs and said heat generation amounts of said lower-stage FETs are calculated by a calculation or by a reference of a map.

5. The motor control unit according to claim 2, wherein square values of said respective phase currents are low pass filter (LPF)-processed and are limited by a predetermined lower limiting value, and said limited amounts are multiplied by said respective phase duty and are outputted as respective heat generation amounts of said upper-stage FETs and respective heat generation amounts of said lower-stage FETs.

6. The motor control unit according to claim 5, wherein said predetermined lower limiting value is a tuning value.

7. The motor control unit according to claim 2, wherein said upper-stage selecting means comprises:
   a first duty selecting section to select said upper-stage selecting duty from said respective phase duties based on said upper-stage maximum heat generation-phase; and a first phase current selecting section to select said upper-stage selecting phase current from said respective phase currents based on said upper-stage maximum heat generation-phase.

8. The motor control unit according to claim 2, wherein said lower-stage selecting means comprises:
a second duty selecting section to select said lower-stage selecting duty from said respective phase duties based on said lower-stage maximum heat generation phase; and
a second phase current selecting section to select said lower-stage selecting phase current from said respective phase currents based on said lower-stage maximum heat generation-phase.

9. The motor control unit according to claim 2, wherein said duty operating amount calculating section calculates said duty operating amount by "{(said lower-stage selecting phase current×said lower-stage selecting phase current×said lower-stage selecting duty)−(said upper-stage selecting phase current×said upper-stage selecting phase current×said upper-stage selecting duty)}/{(said upper-stage selecting phase current×said upper-stage selecting phase current)+(said lower-stage selecting phase current×said lower-stage selecting phase current)}×100(%)".

10. The motor control unit according to claim 2, wherein said duty operating section adds said duty operating amount to said upper-stage respective phase duties and subtracts said duty operating amount from said lower-stage respective phase duties, or said duty operating section subtracts said duty operating amount from said upper-stage respective phase duties and adds said duty operating amount to said lower-stage respective phase duties.

11. An electric power steering apparatus that is equipped with said motor control unit according to claim 2, and assist-controls a steering system of a vehicle.

12. The motor control unit according to claim 1, wherein said lower-stage maximum heat generation phase specifying means comprises:
a lower-stage FET-heat generation amount calculating section to calculate respective heat generation amounts of lower-stage FETs; and
a lower-stage maximum heat generation-phase specifying section to specify said lower-stage maximum heat generation-phase based on respective heat generation amounts calculated at said lower-stage FET-heat generation amount calculating section.

13. The motor control unit according to claim 1, wherein said heat generation amounts of said upper-stage FETs and said heat generation amounts of said lower-stage FETs are calculated by a calculation or by a reference of a map.

14. The motor control unit according to claim 1, wherein square values of said respective phase currents are low pass filter (LPF)-processed and are limited by a predetermined lower limiting value, and said limited amounts are multiplied by said respective phase duty and are outputted as respective heat generation amounts of said upper-stage FETs and respective heat generation amounts of said lower-stage FETs.

15. The motor control unit according to claim 14, wherein said predetermined lower limiting value is a tuning value.

16. The motor control unit according to claim 1, wherein said upper-stage selecting means comprises:
a first duty selecting section to select said upper-stage selecting duty from said respective phase duties based on said upper-stage maximum heat generation-phase; and
a first phase current selecting section to select said upper-stage selecting phase current from said respective phase currents based on said upper-stage maximum heat generation-phase.

17. The motor control unit according to claim 1, wherein said lower-stage selecting means comprises:
a second duty selecting section to select said lower-stage selecting duty from said respective phase duties based on said lower-stage maximum heat generation phase; and
a second phase current selecting section to select said lower-stage selecting phase current from said respective phase currents based on said lower-stage maximum heat generation-phase.

18. The motor control unit according to claim 1, wherein said duty operating amount calculating section calculates said duty operating amount by "{(said lower-stage selecting phase current×said lower-stage selecting phase current×said lower-stage selecting duty)−(said upper-stage selecting phase current×said upper-stage selecting phase current×said upper-stage selecting duty)}/{(said upper-stage selecting phase current×said upper-stage selecting phase current)+(said lower-stage selecting phase current×said lower-stage selecting phase current)}×100(%)".

19. The motor control unit according to claim 1, wherein said duty operating section adds said duty operating amount to said upper-stage respective phase duties and subtracts said duty operating amount from said lower-stage respective phase duties, or said duty operating section subtracts said duty operating amount from said upper-stage respective phase duties and adds said duty operating amount to said lower-stage respective phase duties.

20. An electric power steering apparatus that is equipped with said motor control unit according to claim 1, and assist-controls a steering system of a vehicle.

\* \* \* \* \*